(12) United States Patent
LeVine

(10) Patent No.: US 8,095,418 B2
(45) Date of Patent: Jan. 10, 2012

(54) SYMBIOTIC MASS MARKETING

(76) Inventor: David LeVine, Bradenton, FL (US)

( * ) Notice: Subject to any disclaimer, the term of this patent is extended or adjusted under 35 U.S.C. 154(b) by 636 days.

(21) Appl. No.: 12/136,085

(22) Filed: Jun. 10, 2008

(65) Prior Publication Data

US 2009/0307071 A1 Dec. 10, 2009

(51) Int. Cl.
*G06Q 40/00* (2012.01)
(52) U.S. Cl. .................................................. 705/14
(58) Field of Classification Search ...................... 705/14
See application file for complete search history.

(56) References Cited

U.S. PATENT DOCUMENTS

| | | | |
|---|---|---|---|
| 7,077,979 B2 | 7/2006 | Cheetham | |
| 7,299,194 B1 | 11/2007 | Manganaris | |
| 7,318,036 B2 | 1/2008 | Kim | |
| 7,343,317 B2 | 3/2008 | Jokinen | |
| 7,689,456 B2* | 3/2010 | Schroeder et al. | 705/7.31 |
| 2002/0099678 A1* | 7/2002 | Albright et al. | 706/45 |
| 2004/0133480 A1 | 7/2004 | Domes | |
| 2004/0217585 A1 | 11/2004 | Mitchell | |
| 2005/0149391 A1* | 7/2005 | O'Shea et al. | 705/14 |
| 2006/0010022 A1 | 1/2006 | Kelly | |
| 2006/0015404 A1 | 1/2006 | Tran | |
| 2006/0189372 A1 | 8/2006 | Westrup | |
| 2007/0050246 A1 | 3/2007 | Talavera | |
| 2007/0112636 A1 | 5/2007 | Lucker | |
| 2007/0150537 A1 | 6/2007 | Graham | |
| 2007/0226054 A1* | 9/2007 | Keil et al. | 705/14 |
| 2007/0265919 A1 | 11/2007 | Jarjour | |
| 2008/0046312 A1 | 2/2008 | Shany | |
| 2008/0065481 A1 | 3/2008 | Immorlica | |
| 2008/0065495 A1* | 3/2008 | Nguyen | 705/14 |

OTHER PUBLICATIONS

Danial Sanchez; Putting Motivation back in sales incentives; New York: Aug. 1999. vol. 51, Iss. 8; p. 24, 2 pgs.*
Karen Gines; How to run an incentive program; New York: Dec. 2000. vol. 174, Iss. 12; p. 15, 7 pgs.*
Daniel Caust; A Plan for every customer; NewYork: Jul. 7, 1980. vol. 125, Iss. 1; p. 36.*

* cited by examiner

*Primary Examiner* — Hani M Kazimi
*Assistant Examiner* — Hatem Ali
(74) *Attorney, Agent, or Firm* — Galbreath Law Offices, P.C.; John A. Galbreath

(57) ABSTRACT

The present invention relates to certain methods and systems for promoting the sale of goods and services. According to certain embodiments of the present invention, such methods generally comprise the steps of (1) selling a first good or service to a customer for a discounted price that is less than a standard price, (2) establishing a sales goal (which represents an amount of desired sales of a second good or service to customers during a promotional period), and (3) issuing a credit to, or receiving a payment from, each participating customer based on a level of success achieved towards the sales goal. The invention provides that the extent to which the sales goal is achieved depends on the aggregate sales of the second good or service to the public at large, and is not dependent upon the sales or activity of any single customer.

22 Claims, 6 Drawing Sheets

$X$ = Sales of the second good or service subject to the promotion.

$Y$ = Total cost of the first good or service for each participating consumer.

X = Sales of the second good or service subject to promotion.

Y = Total amount saved for the first good or service for each participating consumer.

X = Sales of the second good or service subject to promotion.

Y = Total cost for the first good or service for each participating consumer.

US 8,095,418 B2

SYMBIOTIC MASS MARKETING

CROSS-REFERENCES TO RELATED APPLICATIONS

Not Applicable.

BACKGROUND

1. Field of the Invention

The field of the present invention relates to certain methods and systems for promoting the sale of goods and services. More particularly, the invention relates to methods and systems for promoting the sale of goods and services to a mass market, in a manner that creates a symbiotic-type of relationship between consumers and advertisers.

The field of e-commerce has become fiercely competitive over the past several years as numerous businesses, both new and old, have started offering goods for sale within websites and other on-line environments. Indeed, in 2007, several billions of dollars in products were estimated to have been sold over the internet. As a result, there is an ongoing and rapidly growing need for businesses to implement procedures that attract customers to their websites, advertise their goods and services, and encourage consumers to purchase such goods and services. Of course, there have been numerous types of advertising techniques used to promote the sale of goods and services, ranging from basic pay-per-click advertising and pop-up ads to other more complicated schemes, such as on-line games having an advertising component incorporated therein.

These methods, however, have grown stale—and are largely ignored by the consuming public. Moreover, such basic forms of advertising do little to encourage consumers to align their interests with those of advertisers, and to assist in promoting the sale of an advertiser's goods or services. While such marketing methods would clearly be very powerful, insofar as an advertiser would benefit from the mass marketing efforts that would result if the consumer were aligned with its interests, effective advertising methods having such features have yet to be developed.

Thus there is a continuing need for new methods of promoting the sale of goods and services, particularly methods that encourage the public to participate in the advertiser's campaign and to promote the sale of the advertiser's goods and services. As explained further below, the present invention addresses many of the foregoing needs.

2. Description of the Related Art

U.S. Pat. No. 7,318,036 discloses a method of discounting a multi-media content item, which is to be sold through a communication network, e.g., a website. This patent discloses that the discount is offered in proportion to the number of advertisements selected by a buyer to be added to the multi-media content item. This patent also discloses that multi-media content purchased by a buyer, and at least one advertisement, are selected individually within, for example, a website. The invention described in this patent requires the purchased multi-media content and the advertisement to be combined, whereupon the price of the combined content is discounted based on how many advertisements are added to the multi-media content.

However, the invention differs from this patent in several ways. First, the discount awarded to a consumer by the invention is not limited to, or necessarily connected to, the amount of times a consumer views a particular advertisement (nor the total number of advertisements viewed). Rather, the amount of the discount is dependent upon the extent to which the advertiser's sales goals are achieved, regardless of whether the sales are generated as a direct result of any particular consumer's efforts. Second, this patent does not disclose a means by which a discount awarded to a consumer, for the purchase of any type of good or service, is influenced by the sales performance of an advertiser's good/service to the public at large (as in the subject invention). Instead, this patent merely teaches a method by which a consumer may generate discounts for the purchase of a good, by agreeing to view one or more advertisements embedded in certain multi-media content.

U.S. Patent Application Publication 2007/0150537 discloses a method of advertising by which individuals allow third party vendors to publish advertisements within their personalized profiles, e.g., within a social networking website. This application discloses that an individual may control the types of advertisements that he/she will allow a vendor to publish within an individualized profile, including the types of goods/services offered and the type of on-line media used. This application also discloses that the individual who publishes a third party vendor's advertisement within his/her individualized profile may be compensated by the advertiser, e.g., for each time that the advertisement is "clicked" by a viewer.

However, the invention differs from this application in several ways. First, the discount awarded to a consumer by the invention is not limited to, or necessarily connected to, the amount of times a consumer views a particular advertisement (nor the total number of advertisements viewed). Rather, the amount of the discount is dependent upon the extent to which the advertiser's sales goals are achieved, regardless of whether the sales are generated as a direct result of any particular consumer's efforts. Second, the incentive described in this application is advertising revenue, whereas the incentive granted by the subject invention is a discount (and/or credit) applied towards the purchase of a good or service. Third, this application does not disclose, or even contemplate, the amount of an incentive (whether such incentive is in the form of a discount or advertising revenue) being influenced by the extent to which an advertiser's sales goals are achieved.

U.S. Patent Application Publication No. 2007/0112636 discloses, in certain embodiments, systems and methods for facilitating the delivery of incentives from vendors to members of a community through a networked system, e.g., a website. This application discloses that upon accessing the website, the members of a community may view incentives, such as promotional materials and advertisements, which have been targeted to their community by a vendor (the community members may share one or more common characteristics). This application further discloses that, in certain embodiments, the incentive awarded to community members by a vendor that sponsors a particular advertisement may be, for example, a coupon (i.e., a form of discount applied towards the purchase of a good or service).

However, the invention also differs from this application significantly. Specifically, with the invention the amount of a discount awarded to a consumer depends on the extent to which the advertiser's overall sales goals are achieved by sales of goods/services to the public at large (wherein the relevant sales goals are tied to a particular promotion for a defined period of time). This important feature of the invention is not disclosed or even contemplated in this application.

SUMMARY OF THE INVENTION

According to certain aspects of the present invention, methods for promoting the sale of goods and services are provided. Such methods generally comprise the steps of (1) selling a first good or service to a customer for a discounted price that is less than a standard price, (2) establishing a sales goal (which represents an aggregate amount of desired sales of any second good or service during a promotional period), and (3) issuing a credit or receiving a payment from each participating consumer based on a level of success achieved towards the sales goal. The invention provides that the extent to which the sales goal is achieved depends on the sales of the subject (second) good or service to the public at large, and is not dependent upon the sales or activity of any single consumer. The second good or service that is subject to the promotion can be the same as the first good or service that is originally purchased by a participating consumer. However, the invention provides that in certain preferred embodiments, the second good or service that is subject to the promotion will be different than the first good or service that is originally purchased by a participating consumer.

According to additional aspects of the present invention, systems for promoting the sale of goods or services are provided. The systems generally comprise a server that is capable of hosting a website in which an advertiser sells a first good or service to a customer for a discounted price that is less than a standard price. The systems further comprise a database capable of recording information correlated with a promotion. The invention provides that a database listing for a promotion includes a sales goal established by an advertiser that represents a desired amount of aggregate sales of a second good or service to customers located throughout a territory during a promotional period. The second good or service that is subject to a promotion described herein can be the same as the first good or service originally purchased by a participating consumer. However, as with the methods described herein, the second good or service that is subject to a promotion will preferably be different than the first good or service originally purchased by a participating consumer. According to such embodiments, the server is preferably capable of calculating a credit owed to, or payment owed by, each consumer participating in the promotion based on an overall level of success achieved towards the sales goal.

A further discussion of the many advantages of the invention follows:

A key marketing problem is that only small number of users will participate in the marketing of a particular product. For example, it is estimated that only about 1% of online purchasers write comments, submit videos, etc. The Symbiotic Mass Marketing of the invention differs significantly from a normal advertising campaign. In a normal advertising campaign, only a very small percentage of consumers who view the advertisement will purchase, and thus most of the advertisement effort is directed toward an overall "brand building" campaign.

With Symbiotic Mass Marketing, the marketing message to these consumers is significantly stronger and more personal. For example, the promoted products are tied to something that the consumer values. The consumer wants this TV show for example, and now the advertised product is connected to that TV show through a potential savings in their entertainment expense. The consumer's relationship to the advertised product is more personal, more relevant and stronger than other marketing messages.

Moreover, every time the consumer logs in to their entertainment website (iTunes for example), they see the sales goal status and how much money they are saving. A constant, positive feedback loop is created which further increases the connection between the consumers and the advertised product. In the case of a successful campaign where the users are saving a lot of money, such a feedback loop creates a buying frenzy which boosts sales of the advertised product significantly.

Further, the inventive method encourages word of mouth marketing. Word of mouth marketing is a very strong form of marketing because it breaks through the barriers of mistrust and believability. The Symbiotic Mass Marketing of the invention encourages word of mouth marketing, and the encouragement is reinforced every time the consumer logs onto a website that uses the method.

Under normal circumstances, it is estimated that only 0.5% to 1% of consumers will 'spread the word'—i.e., tell their friends about the product or service they have purchased. With Symbiotic Mass Marketing, the financial benefit to each consumer is designed to increase the number of people who will 'spread the word'. For example, if the percentage of consumers that 'spread the word' increases to just 3%, that represents a 3 to 6-fold increase in word of mouth marketing. This is significant, because a small increase in the percentage of people promoting a product or service they've purchased can have a massive positive impact on the sales of the product or service.

Even better, the word of mouth marketing will not only increase sales of the target product or service, it will also increase sales of the original vehicle for an advertisement (e.g., a television show, website, etc.). As just one example, more users will buy a particular television show offered online, which will also result in more word of mouth marketing. Consumers will be encouraged to buy the television show because of the significant discount that can be obtained on the purchase by participating in the inventive method, and the positive brand reinforcement of the target product or service will be even greater.

The above-mentioned and additional features of the present invention are further illustrated in the Detailed Description contained herein.

DETAILED DESCRIPTION OF THE INVENTION:

The following will describe in detail several preferred embodiments of the present. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention can be employed, used and made without departing from the scope and spirit of the invention.

Figure 1:
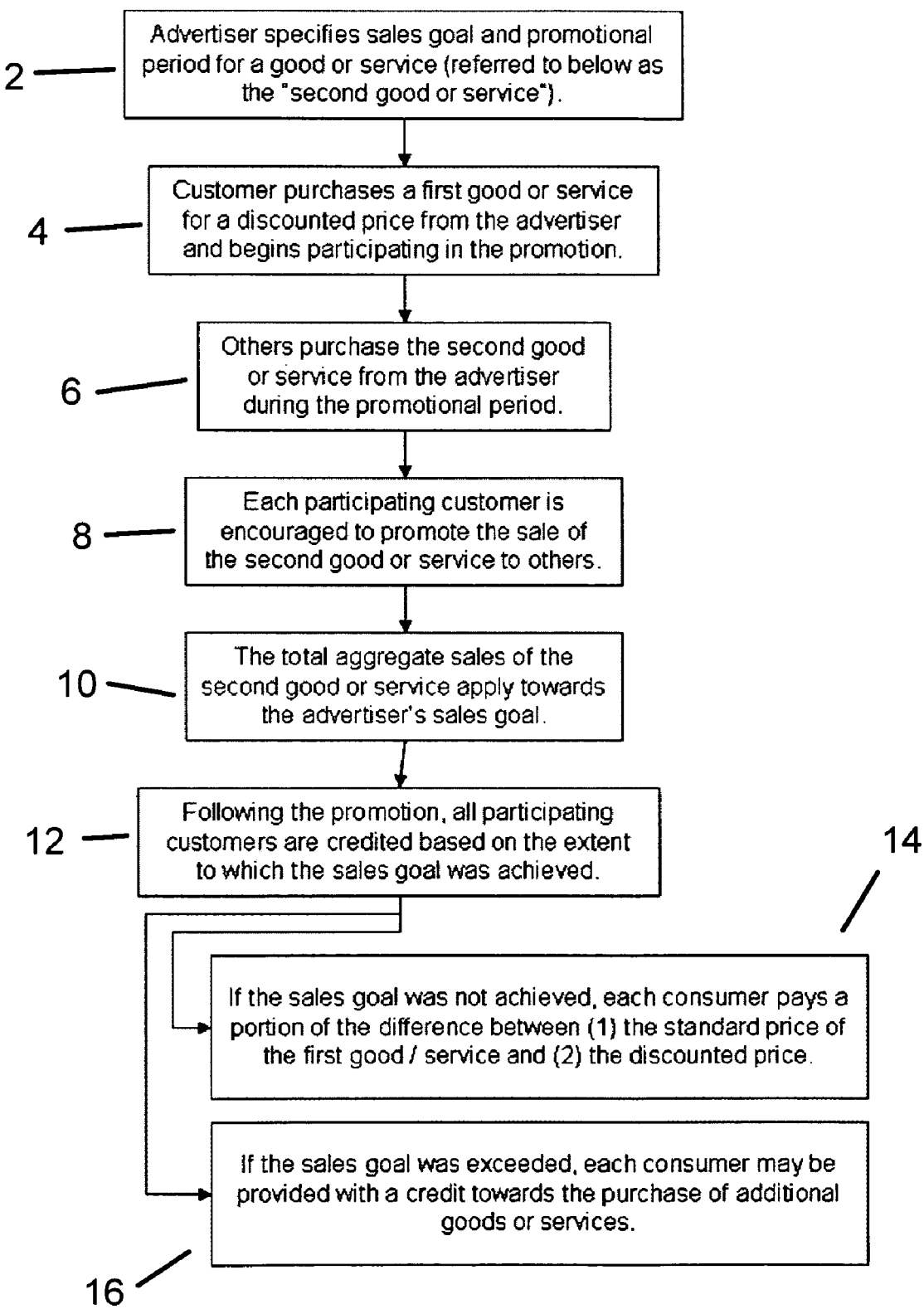
FIG. 1 is a flow diagram that outlines certain methods of the present invention.

According to certain aspects of the present invention, methods for promoting the sale of goods and services are provided. Referring to FIG. 1, such methods generally begin with an advertiser establishing a sales goal for a promotion 2. The sales goal can be, for example, making a specified number of sales of certain goods or services within a defined period of time. That is, the promotion will preferably represent a targeted promotion to encourage the sale of one or more goods or services, preferably during a defined period of time (which is referred to herein as the promotional period). The invention provides that the promotion can entail sales of all types of goods and services, including sales within and outside an advertiser's website. A non-limiting example can be a promotion designed to sell a defined number of digital media products within an advertiser's website, such as music and/or movie content.

Next, a customer purchases a first good or service 4 from the advertiser. The first good or service purchased by the consumer can be the same as, or different than, a second good or service that is the subject of the advertiser's sales goal and its promotion 2. In certain preferred embodiments, however, the first good or service purchased by the consumer will be different than the second good or service that is the subject of the advertiser's sales goal and its promotion. The invention provides that the customer purchases the first good or service 4 at a discounted price, i.e., the initial sales price is reduced from a standard price. According to certain embodiments of the invention, the consumer agrees that he/she might be required to pay all or a portion of the difference between the initial discounted price and the standard price, depending on the outcome of the advertiser's promotion. In such embodiments, the consumer's agreement to pay such difference (or a portion thereof) can be consummated by having the consumer acknowledge and agree to an agreement which contains such obligations, such as an agreement that the consumer views and acknowledges in an on-line environment prior to finalizing the purchase of the first good or service. In certain cases where the consumer makes the purchase in an on-line environment, the consumer can further agree that, depending on the outcome of the advertiser's promotion, the advertiser will be entitled to charge all or a portion of the difference between the initial discounted price and standard price to the consumer's registered credit card, debit card, on-line account, or other payment methods.

The invention provides that, in certain alternative embodiments, instead of the consumer purchasing the first good or service at a discounted price, the consumer can initially purchase the first good or service for the standard/full price. In such embodiments, based on the outcome and performance level of the promotion, the consumer can be awarded a credit (or rebate), instead of having the consumer being required to potentially pay a portion of the difference between the standard and discount price for the first good or service.

Figure 5:
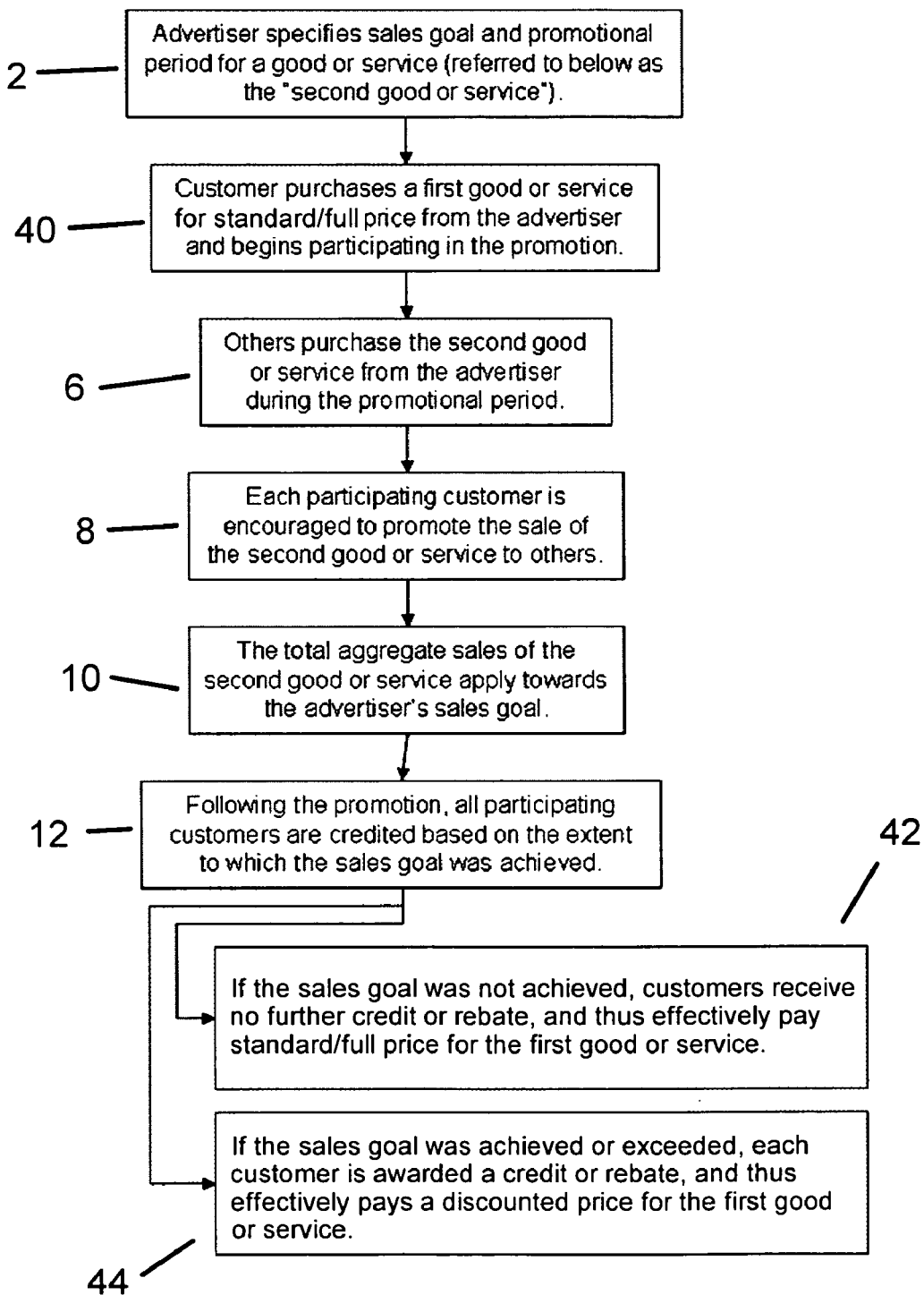
FIG. 5 is a flow diagram illustrating the embodiment where the consumer buys first at standard/full price, and then receives a credit based on the performance of the sales promotion.

The above alternative embodiment is shown in FIG. 5, and this method is similar to that shown in FIG. 1, except that the customer purchases the first good or service for standard/full price from the advertiser 40. The customer then begins participating in the promotion. After the promotion is over, if the sales goal was not achieved, customers receive no further credit or rebate, and thus effectively pay standard/full price for the first good or service 42. If the sales goal was achieved or exceed, each consumer is awarded a credit or rebate, and thus effectively pays a discounted price for the first good or service 44.

It can be understood that both scenarios—selling a first good or service to a customer for standard/full price, or a discounted price—can collectively be thought of as selling the first good or service at a price that is a predetermined fraction of the standard/full price. That predetermined fraction can of course be 100%, as in the case where the first good or service is sold at standard/full price—or the predetermined fraction can be less than 100%, as in the case where the first good or service is sold at a discounted price.

It should be understood that the opportunity to participate in the promotion, and the potential to receive a discount, can be presented to the consumer when the consumer is seeking to purchase the first good or service, or alternatively, the inventive method and system can automatically include the consumer in the promotion. As just two examples of the former scenario, a button indicating a promotion/discount opportunity can be present on a web page featuring the first good or service, or a pop-up window can be presented when the consumer places an item into an online "shopping cart". As an example of the latter scenario, the consumer can automatically be made a participant when they purchase the first good or service through a particular online store.

In addition, the first good or service does not have to be sold as a discrete or individual unit—instead, the first good or service can be a subscription. For example, a consumer who purchases a Napster ToGo subscription can then be included in a Symbiotic Mass Marketing promotion.

At this point, the consumer is considered to be participating in the advertiser's promotion. As described below, the extent to which the advertiser's sales goal is achieved for its promotion will influence the total discount (or purchase credit) awarded to each participating consumer. Thus, during the promotional period, as other consumers purchase the subject (second) goods or services 6 of the promotion, progress towards the sales goal is achieved—and all participating consumers will ultimately benefit. The invention provides that the goods or services that are subject to a promotion (often referred to herein as the "second goods or services") can be the same as, or different than, the good or service which a participating consumer initially purchases to become enrolled in the promotion (often referred to herein as the "first goods or services").

The participating consumer is thus encouraged to assist the advertiser and promote the sale of the second goods or services that are subject to the promotion 8. Because the extent to which the advertiser's sales goal is achieved will influence the total discount (or purchase credit) awarded to each participating consumer, participating consumers have an interest in promoting the sale of the advertiser's goods or services, insofar as the more goods or services that the advertiser sells, the greater the discount (or purchase credit) each participating consumer will receive. The advertiser can provide certain tools for participating consumers to use to promote its goods or services. Non-limiting examples of such tools can include internet-based advertisements that participating consumers can download and publish in their own web pages. In addition, the invention provides that participating consumers can employ other promotion techniques, such as basic word-of-mouth practices, blogs, chat rooms, e-mail, and other communication tools, all for the purpose of promoting the advertiser's goods and services in order to maximize the discount awarded to participating consumers.

Following the conclusion of the promotion, the aggregate sales of the subject (second) goods or services are calculated, and compared to the sales goal for such promotion 10. Each participating consumer will be awarded a discount (or receive a credit) 12 towards the purchase of the first good or service that it previously purchased 4 to commence its participation in the promotion. More specifically, if the advertiser's sales goal is not achieved in full, each participating consumer will pay the advertiser 14 a portion of the difference between (1) the standard price of the first good/service and (2) the discounted price 12. The amount of such portion can be pro rated based on the extent to which the advertiser's sales goal is achieved. For example, if the aggregate sales of the second good or service during the promotion reached 75% of the established sales goal, then participating consumers might only be required to pay the advertiser 14 a small percentage of the difference between (1) the standard price of the first good/service and (2) the discounted price, such as 25% of such differential amount. If the advertiser's sales goal was achieved or exceeded, each participating consumer can be granted a credit towards the purchase of additional goods or services 16 offered by the advertiser. Here again, the amount of such credit can be pro rated, or influenced by, the extent to which the advertiser's sales goal was exceeded.

The invention provides that, in addition to the extent to which the sales goal of a promotion is achieved, other factors can further influence the total amount of discount (or purchase credit) awarded to participating consumers. For example, the point of entry of each consumer into a promotion can also influence the total amount of discount (or purchase credit) awarded to participating consumers. That is, the invention provides that participating consumers who enter the promotion close to the end of its term will be granted less of a discount (or purchase credit) compared to participating consumers who enter the promotion at the beginning portion thereof. Thus, the following represent non-limiting examples of a means for calculating the amount of discount (or purchase credit) awarded to each participating consumer:

$$\frac{\text{Actual Sales}}{\text{Goal}} = \% \text{ of Goal Achieved}$$

In the above equation, "Actual Sales" represents the aggregate sales of the second good or service during the promotional period, and "Goal" represents the advertiser's sales goal for a specific (second) good or service. For example, if the advertiser's goal was to sell 100,000 units of the second good or service during the promotional period, and 99,000 units were actually sold during that period, then 99% of the goal was achieved.

Standard price−Discounted price=Discount

In the above equation, "Standard price" represents the standard price for the first good or service, "Discounted price" represents the discounted price for the first good or service, and "Discount" represents the difference between the standard price and the discounted price. For example, if the standard price is $100, and the discounted price is $90, then the discount is $10. The discount can also be thought of as a percentage, which would be 10% using the above example.

$$\frac{\text{Total Promotional Period} - \text{Expired Portion}}{\text{Total Promotional Period}} = \begin{array}{l}\% \text{ of Promotional Period} \\ \text{for which Consumer is a} \\ \text{Participant}\end{array}$$

In the above equation, "Total Promotional Period" represents the total length of time of the promotional period, "Expired Portion" represents the length of time of the promotional period that had expired at the point of entry for a participating consumer (i.e., at the time point at which such consumer purchased the first good or service), and "% of Promotional Period" represents the percentage (%) of the promotion during which a consumer was considered a participant. For example, if the total promotional period was 60 days, and a particular consumer entered the promotion 15 days after it began, then that consumer would be considered a participant for 75% of the promotion.

Discount×% of Goal Achieved×% of Promotional Period Participating=Total Discount or Purchase Credit The above equation combines the results of the prior three equations to arrive at the total discount or purchase credit awarded to the participating consumer. If the total discount is above the initial discount, the consumer receives a purchase credit towards other goods or services for such excess amount, and if the total discount is below the initial discount, the consumer can be required to pay the difference between the initial discount and the total discount awarded. In the case where the consumer buys first at standard/full price, and then receives a discount or purchase credit later based on the performance of the promotion, the total discount of course represents the amount of such discount or purchase credit that is later received. For example, if the initial discount was $10, the consumer participated for the entire promotion and the goal was overachieved by 20%, then the total discount would be $12.

The invention provides that consumers can be allowed to participate in only a single promotion at any given time or, in other embodiments, in multiple promotions. If consumers are allowed to participate in only a single promotion, and consumers are allowed to exit a promotion prior to the expiration thereof, the percentage (%) of the promotion during which a consumer was considered a participant (Ω) should consider both the entry and exit points of a consumer into a promotion, relative to the entire length of the promotional period.

In addition, the invention provides that multiple advertisers can run promotions in parallel with each other. For example, two advertisers can both offer the same first good or service for sale to participating consumers at a discounted price—the purchase of which will enroll a consumer into either of the advertiser's promotions. The second good or service that is the subject of each advertiser's sales goal will, of course, be different. That is, the second good or service for a first advertiser will likely be its own good or service, whereas the second good or service for a second advertiser will likely be the good or service of the second advertiser. As such, while the first good or service the purchase of which will enroll a consumer into a promotion can be the same, whether a consumer technically purchases such first good or service from a first or second advertiser will dictate which promotion will apply to such consumer (and will also dictate the identity of the second good or service that will be the subject of the applicable sales goal).

In a multiple-advertiser scenario, the current performance of each advertiser's promotion can be shown to the consumer, and the consumer can use this information to help pick which promotion he or she wants to participate in. Thus the inventive method can have "stock market" characteristics—that is, it is to the advertiser's advantage to offer an attractive promotion so that consumers will choose its promotion over others and participate actively, thereby boosting sales of the second good or service more; thereby increasing the promotion performance measure shown, so that more consumers pick the promotion; and so on in a virtuous circle.

A number of trends apply to the methods of promoting the sale of goods and services described herein. For example, referring to FIG. 2, the most basic trend relates to the total number of sales of a subject (second) good or service and its impact on the total cost of the first good or service to participating consumers. In short, the greater the aggregate sales of a second good or service that is subject to a promotion, the less participating consumers will be required to pay towards the purchase of the first good or service. In other words, and referring to FIG. 3, the greater the aggregate sales of the second good or service, the greater the discount that will be awarded to participating consumers (which will apply towards the purchase of the first good or service).

Figure 2:
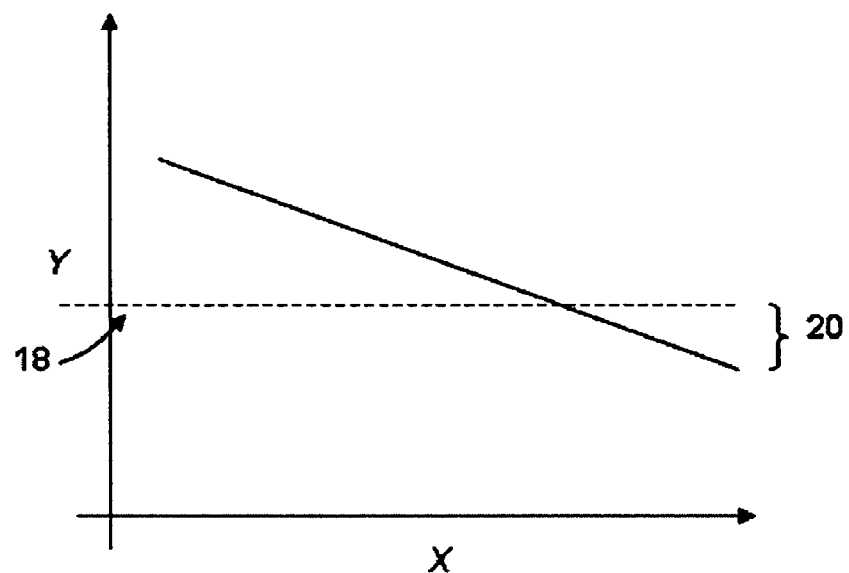
FIG. 2 is a line graph showing the relationship between the cost of a first good or service charged to a consumer and the total sales of a second good or service that is subject to a promotion described herein.
Figure 3:
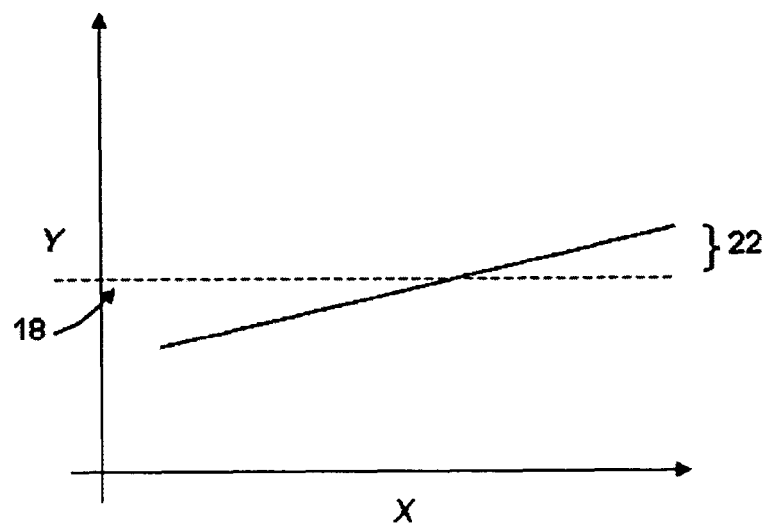
FIG. 3 is a line graph showing the relationship between the total amount saved by a consumer on the purchase of a first good or service and the total sales of a second good or service that is subject to a promotion described herein.
Figure 4:
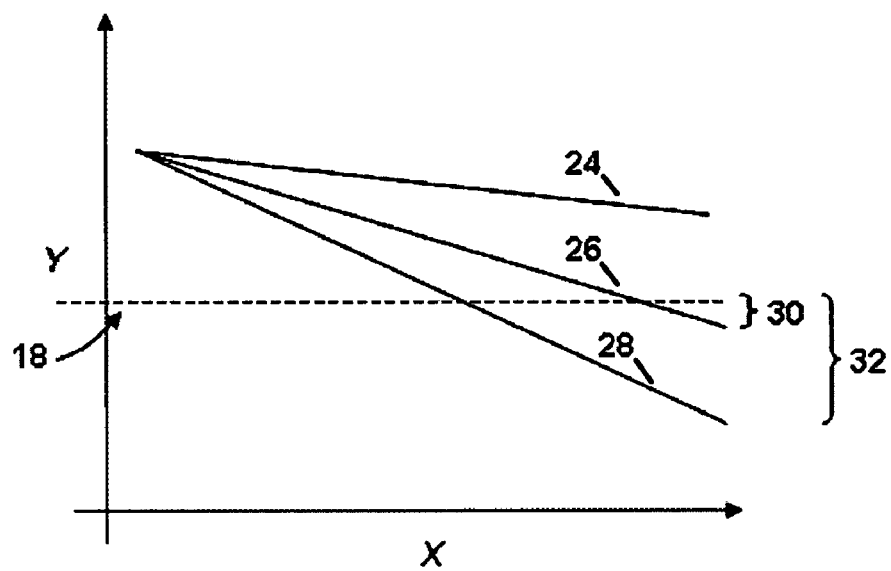
FIG. 4 is a line graph showing the relationship among the cost of a first good or service charged to a consumer, the total sales of a second good or service that is subject to a promotion described herein, and the effect that the volume of consumers participating in the promotion will have on the foregoing.

In FIGS. 2-4, the dashed line 18 represents the point at which the total discount awarded to participating consumers is equal to the difference between the standard and discount price for the first good or service. The data line (i.e., the solid line or lines in the graphs) represents in FIGS. 2 and 4 the total cost Y of the first good or service at a particular level of sales X of the second good or service; and in FIG. 3 the data line represents the amount Y saved on the first good or service at a particular level of sales X of the second good or service. In other words, the intersection of line 18 and the data line represents the point at which the full potential discount is realized by a participating consumer, and any sales beyond that intersection can translate into a net credit to be awarded to participating consumers. More specifically, referring to FIG. 2, the extent to which the data line (i.e., the solid line in the graph) dips below line 18 represents an amount 20 by which the sales goal of the promotion was exceeded at the conclusion of the promotion. This amount is also represented in FIG. 3, but is shown as the inverse portion 22 thereof, since as discussed above the FIG. 3 data line represents the amount saved by participating consumers. The extent to which the data line dips below line 18 (shown as 20), or ascends above line 18 (shown as 22), represents an amount of credit that participating consumers can be awarded at the conclusion of the promotion—as the sales goal was exceeded in such instances.

The invention provides that increases in the number of participating consumers not only increases each participant's discount (vis-à-vis the consumers purchasing the second good or service and creating progress towards the sales goal), such increases also can have a catalytic effect on the rate at which the sales goal is achieved. Referring to FIG. 4, for example, lines 24, 26, and 28 each represent a pool of participating consumers, with pool 28 having more consumers than pool 26, which has more consumers than pool 24. Since participating consumers are preferably encouraged to assist the advertiser in promoting the sale of the second good or service that is subject to the promotion (to enhance the total discount or credit awarded), having more consumers who are actively promoting such goods should translate into a more rapid growth in sales. This trend is reflected in FIG. 4, with the slope of line 28 being greater than the slope of line 26, which is greater than the slope of 24. Similarly, it should be observed that the pool of consumers 28 reaches the 100% discount line 18 sooner than the pool of consumers 26 (with time passing from left to right in FIG. 4). Still further, it should be observed that the pool of consumers 28 achieves a greater net credit 32 than the pool of consumers 26, which has a comparatively smaller net credit 30. In this example, the pool of consumers 24 does not reach the 100% discount line 18. The purpose of the foregoing is to illustrate the symbiotic- and viral-like marketing properties of the methods described herein. It should be understood that FIG. 4 does not represent that different pools of consumers are participating in the same promotion; rather, FIG. 4 illustrates the positive and negative effects of having greater or lesser numbers of consumers in the promotion pool.

The invention provides that the foregoing methods can be facilitated through the use of a website, although this is not a requirement. For example, the invention provides that a website can be provided in which an advertiser can access a secure and individualized account page in which the advertiser can establish a promotion. The advertiser can specify, for example, (1) the goods and/or services that will be the subject of the promotion, (2) the duration of the promotional period, (3) the sales goal, (4) the territory (e.g., whether the promotion will apply to sales occurring throughout the entire world, or only in select countries, states, or cities), and (5) other relevant factors. The invention further provides that advertisers can initiate multiple promotions to run in parallel, each of which can encompass the same or different promotional periods, sales goals, and goods or services (e.g., a first promotion might run a month, whereas a second promotion might run only for a week during such month).

The invention provides that the website can include a meter which shows the real-time status of and progress towards a sales goal. Similarly, the website can include a meter (or some other indicator) which shows the average amount of discount to which each participating consumer is entitled at any given time during the promotion. In addition, the invention provides that such website can be centralized, such that multiple advertisers can organize, summarize, and publish the results of their promotion therein. Advertisers can optionally be required to pay a fee (or commission) in exchange for organizing and implementing a promotion through such a centralized website, or the method can operate without such a fee. Under this approach, consumers at large will associate the centralized website with a variety of different promotions, which can be offered by a plurality of different advertisers. Alternatively, the invention provides that the methods described herein can be embodied in a website associated with a single advertiser, e.g., the primary website managed by a particular advertiser/vendor.

While a website can be used to carry out the inventive methods, one is not required. For example, an advertiser can sell a first good or service to a consumer, establish a sales goal for a second good or service, and then issue a discount (or credit) to such consumer based on the extent to which the advertiser's sales goal is achieved. The foregoing steps can be performed outside the context (or without the use) of a website or other computing environment and, alternatively, can utilize more conventional advertising and communication means to carry out such methods.

Figure 6:
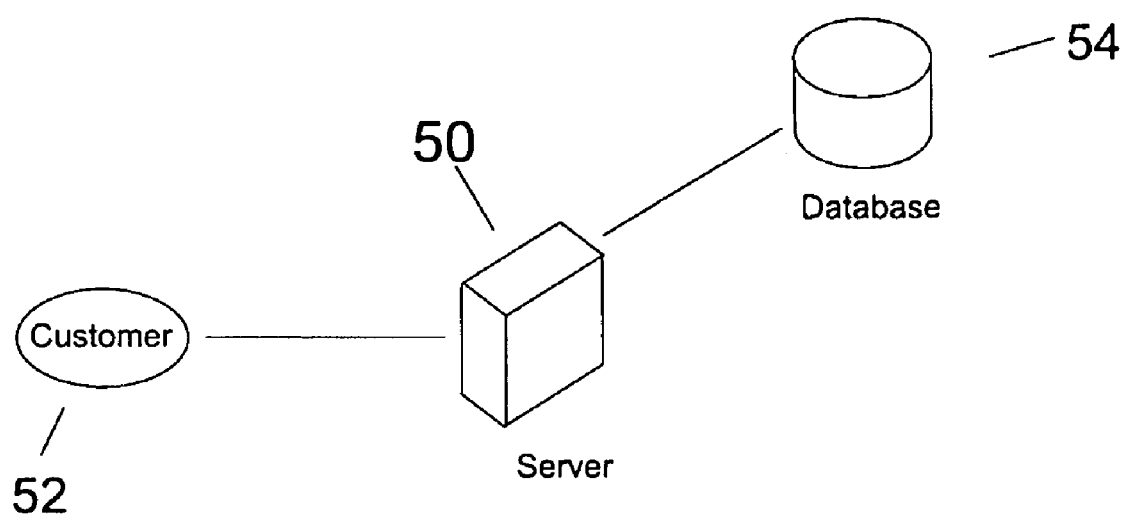
FIG. 6 is a diagram of a system for operating the inventive method.

According to additional aspects of the present invention, systems for promoting the sale of goods or services are provided. More particularly, the systems of the present invention are designed to carry out the methods described herein. As shown in FIG. 6, the systems generally comprise a server 50 that is capable of hosting a website in which an advertiser initially sells a good or service to a customer 52 for a discounted price that is less than a standard price, or for standard/full price in the case of the alternative embodiment discussed earlier and shown in FIG. 5. The systems further comprise a database 54 capable of recording information correlated with a promotion. The invention provides that a database listing for a promotion includes a sales goal established by an advertiser that represents a desired amount of sales of the good or service to customers located throughout a territory during a promotional period. According to such embodiments, the server 50 is preferably capable of calculating a credit owed to, or payment owed by, each consumer participating in the promotion based on a level of success achieved towards the sales goal.

The following example demonstrates how an on-line vendor can utilize the methods described herein to carry out a promotion. In this example, the vendor allocates 30% of its advertising budget to the promotion. First, the advertising budget to obtain a new customer is calculated, e.g., $200,000,000 (annual marketing budget) divided by 1,600,000 (the number of new customers per year), equals the advertising budget for each new customer–$125. If the vendor wishes to allocate 30% of its advertising budget to the promotion, then the vendor is willing to pay $37.50 per new customer for this promotion, i.e., 30% of $125.

Next, the amount of reimbursement per consumer is calculated. If the vendor estimates that 10,000,000 consumers will participate, then the reimbursement per consumer per sale of the subject good or service will be $0.00000375 (i.e., $37.50 divided by 10,000,000 consumers). The vendor's total cost can then be calculated, by multiplying the number of actual sales of the subject good or service by the reimbursement per consumer per sale of the subject good or service. In this example, if the vendor made 1,800,000 actual sales of the subject good or service, then each participating customer will be reimbursed $6.75, for a total net advertising cost of $67,500,000.

It is to be understood that both the general description and the detailed description are exemplary and explanatory, but are not restrictive of the invention. The invention in its broader aspects is not limited to the specific details shown and described, and departures can be made from such details without departing from the principles of the invention and without sacrificing its chief advantages.

What is claimed is:

1. A method of promoting the sale of goods or services, comprising the steps of:
    (a) selling, via a server hosting a website, a first good or service to a customer for a price that is a predetermined fraction of a standard price;
    (b) establishing a sales goal and storing the sales goal in a database, wherein the sales goal is an amount of aggregate sales of a second good or service, different from the first good or service, to consumers located throughout a territory during a promotional period; and
    (c) issuing, by a computer, a credit to, or receiving a payment from, a plurality of customers of the first good or service based on a level of success achieved towards the sales goal.

2. The method of claim 1, wherein the predetermined fraction is 100% of the standard price.

3. The method of claim 1, wherein the predetermined fraction is less than 100% of the standard price, and the first good or service is thereby sold at a discounted price.

4. The method of claim 3, wherein the level of success is a percentage of the sales goal that is achieved during the promotional period for the second good or service.

5. The method of claim 4, wherein:
    (a) the percentage of the sales goal that is achieved is less than 100%, and the customer pays an advertiser a portion of a difference between the standard price and discounted price; or
    (b) the percentage of the sales goal that is achieved is greater than 100%, and the advertiser provides the customer with a credit towards purchasing an additional good or service.

6. The method of claim 3, wherein the promotional period is limited to a defined period of time.

7. The method of claim 3, wherein an amount of (a) the portion of the difference between the standard price and discounted price paid by the customer or (b) credit provided to the customer, is adjusted based on a participation period attributed to the customer, wherein the participation period is calculated by dividing (i) a period of time beginning on a date on which the customer purchases the first good or service and ends upon expiration of the promotional period by (ii) a total length of time encompassed by the promotional period.

8. The method of claim 3, wherein the territory comprises the entire world, one or more countries, one or more states, or one or more cities.

9. The method of claim 3, which further comprises publishing a current level of success achieved towards the sales goal in an on-line environment.

10. The method of claim 3, which further comprises providing a means for enabling the customer to promote sales of the second good or service.

11. The method of claim 3, which further comprises publishing a current amount saved by each of a plurality of customers who purchased the first good or service during the promotional period in an on-line environment.

12. A method of promoting the sale of goods or services, comprising the steps of:
    (a) selling, via a server hosting a website, a first good or service to a customer for a discounted price that is less than a standard price;
    (b) establishing a sales goal and storing the sales goal in a database, wherein the sales goal is an amount of sales of a second good or service, different from the first good or service, to customers located throughout a territory during a promotional period that is limited to a defined period of time; and
    (c) issuing, by a computer, a credit to, or receiving a payment from, each customer of the first good or service based on a level of success achieved towards the sales goal, wherein the level of success is a percentage of the sales goal that is achieved during the promotional period for the second good or service, and wherein
        (i) the percentage of the sales goal that is achieved is less than 100%, and the customer pays an advertiser a portion of a difference between the standard price and discounted price, or
        (ii) the percentage of the sales goal that is achieved is greater than 100%, and the advertiser provides the customer with a credit towards purchasing an additional good or service.

13. The method of claim 12, wherein an amount of (a) the portion of the difference between the standard price and discounted price paid by the customer or (b) credit provided to the customer, is adjusted based on a participation period attributed to the customer, wherein the participation period is calculated by dividing (i) a period of time beginning on a date on which the customer purchases the first good or service and ends upon expiration of the promotional period by (ii) a total length of time encompassed by the promotional period.

14. A system for promoting the sale of goods or services, comprising:
  (a) a server that is capable of hosting a website in which an advertiser sells a first good or service to a customer for a discounted price that is less than a standard price; and
  (b) a database capable of recording information correlated with a promotion, wherein (i) a database listing for a promotion includes a sales goal established by the advertiser that represents a desired amount of sales of a second good or service, different from the first good or service, to customers located throughout a territory during a promotional period and (ii) the server is capable of calculating a credit owed to, or payment owed by, each customer of the first good or service participating in the promotion based on a level of success achieved towards the sales goal.

15. The system of claim 14, wherein the level of success is a percentage of the sales goal that is achieved during the promotional period for the second good or service.

16. The system of claim 15, wherein:
  (a) the percentage of the sales goal that is achieved is less than 100%, and the customer pays a portion of a difference between the standard price and discounted price; or
  (b) the percentage of the sales goal that is achieved is greater than 100%, and the advertiser provides the customer with a credit towards purchasing an additional good or service.

17. The system of claim 14, wherein the promotional period is limited to a defined period of time.

18. The system of claim 14, wherein an amount of (a) the portion of the difference between the standard price and discounted price paid by the customer or (b) credit provided to the customer, is adjusted based on a participation period attributed to the customer, wherein the participation period is calculated by dividing (i) a period of time beginning on a date on which the customer purchases the good or service and ends upon expiration of the promotional period by (ii) a total length of time encompassed by the promotional period.

19. The system of claim 14, wherein the territory comprises the entire world, one or more countries, one or more states, or one or more cities.

20. The system of claim 14, wherein the website comprises a graphic that indicates a current level of success achieved towards the sales goal.

21. The system of claim 14, wherein the website comprises a means for enabling the customer to promote sales of the second good or service.

22. The system of claim 14, wherein the website comprises a graphic that indicates a current amount saved for each customer who purchased the first good or service during the promotional period.

* * * * *